(12) United States Patent
Merlin et al.

(10) Patent No.: US 6,405,088 B1
(45) Date of Patent: Jun. 11, 2002

(54) TELEMETRY COIL ARRANGEMENT FOR RECEIVING DATA SIGNALS IN PARTICULAR FROM CARDIOLOGIC IMPLANTS

(75) Inventors: Julian Merlin; Frank Koch, both of Berlin (DE)

(73) Assignee: Biotronik Mess- und Therapiegeräte GmbH & Co. Ingenieurbüro Berlin, Berlin (DE)

( * ) Notice: Subject to any disclaimer, the term of this patent is extended or adjusted under 35 U.S.C. 154(b) by 60 days.

(21) Appl. No.: 09/595,017

(22) Filed: Jun. 16, 2000

(30) Foreign Application Priority Data

Jun. 19, 1999 (DE) .......................................... 199 28 216

(51) Int. Cl.⁷ ................................................. A61N 1/00

(52) U.S. Cl. .......................................................... 607/60
(58) Field of Search ............................. 607/60, 30, 31, 607/32, 65, 61, 62, 9, 5

(56) References Cited

U.S. PATENT DOCUMENTS 5,630,835 A 5/1997 Brownlee
5,741,315 A 4/1998 Lee et al.

FOREIGN PATENT DOCUMENTS

DE 39 36 547 5/1991
EP 0 917 079 5/1999

*Primary Examiner*—Scott M. Getzow
(74) *Attorney, Agent, or Firm*—Browdy and Neimark

(57) ABSTRACT

A telemetry coil arrangement for the telemetric reception of transmitted signals, in particular in cardiologic implants, comprises coils of varying diameters and numbers of windings suited thereto.

10 Claims, 3 Drawing Sheets

TELEMETRY COIL ARRANGEMENT FOR RECEIVING DATA SIGNALS IN PARTICULAR FROM CARDIOLOGIC IMPLANTS

BACKGROUND OF THE INVENTION

1. Field of the Invention

The invention relates to a telemetry coil arrangement for receiving data signals in particular from cardiologic implants, comprising a pair of coils disposed one after the other in the direction of reception.

2. Background Art

A telemetry receiver coil arrangement of the generic type is known from U.S. Pat. No. 5,630,835, which discloses an electronic apparatus for the non-invasive communication with an implanted device such as a cardiac pacemaker. An antenna arrangement with two coils connected in opposite directions is provided in the electronic apparatus—which is a so-called "programming head" in the case under regard. This known antenna arrangement with the two coils connected in series in opposition of phase helps suppress the effects of so-called far-field interference signals on the received near-field signals from the implant.

The effect underlying the known prior art bases on the fact that the mentioned interference fields in the form of far-field interference signals are substantially represented by homogeneous electromagnetic fields, whereas the transmitter field of the implant represents a decidedly inhomogeneous electromagnetic field. As a result of the connection, in opposition of phase, of the two coils, the homogeneous signal portions neutralize each other, whereas the inhomogeneous signal portions are only slightly damped. This helps improve the signal-to-noise ratio from 1:1 to an order of magnitude of for instance, 47:1 when only a single receiver coil is used, given the geometry of the two coils specified in the exemplary embodiment of the publication cited at the outset. In theory, even total suppression of homogeneous fields can be attained.

U.S. Pat. No. 5,741,315 teaches, in a telemetric data transmission device, to dispose a receiver coil and a compensation coil of differing diameters on a cup-shaped support such that inhomogeneous signals—namely the signals emitted by the implant—are observed only in the receiver coil, whereas homogeneous signals—namely interference signals—are measured also in the compensation coil.

Since cardiologic implants, for instance a cardiac pacemaker, emit only very weak magnetic fields for data transmission, which have to be received in comparatively interfering surroundings, inhomogeneous interference fields should also be suppressed in a suitable manner. This is not feasible by the coil arrangement specified in U.S. Pat. No. 5,630,835.

SUMMARY OF THE INVENTION

It is the object of the invention to improve the receiving properties of telemetry coil arrangements for the reception of data signals in particular in cardiologic implants.

According to the basic concept of the solution, according to the invention, of this object, the prior art double coil principle can be improved by the coils having differing diameters and/or—in particular with systems of coils of identical diameter—by the coils being put in circuit asymmetrically. Certain directional characteristics can be attained by this measure, which can help improve the suppression of inhomogeneous interference fields. The number of windings on the coils must be adapted in such a way that, in spite of these differing diameters of the coils or the asymmetric circuitry of the coils, voltages induced by homogeneous interference fields will cancel each other, given a corresponding circuitry of the coils. Details of this will become apparent from the description of the exemplary embodiments.

Further problems in telemetry coil arrangements reside in the so-called "zeroes" in the case of lateral displacement of the emitter and receiver coil. Observations show that in the case of certain ranges of lateral or radial displacement between the two coil systems, the voltage of reception becomes zero regardless of the amplitude of the emitter field. As will become apparent from the exemplary embodiments, different coil systems have different zeroes. In the case of at least three coils of at least two different diameters and in the case of corresponding coupling of these coil systems, the coil systems, in a certain situation of reception, can be individually connected to form combinations of coils of optimal receiving properties. The selection from various system configurations can be effected for instance by evaluation of suitable signal parameters such as the amplitude or the signal-to-noise ratio.

Further features, details and advantages of the invention will become apparent from the ensuing description of exemplary embodiments of the subject matter of the invention, taken in conjunction with the attached drawings.

DESCRIPTION OF THE PREFERRED EMBODIMENTS

Figure 1:
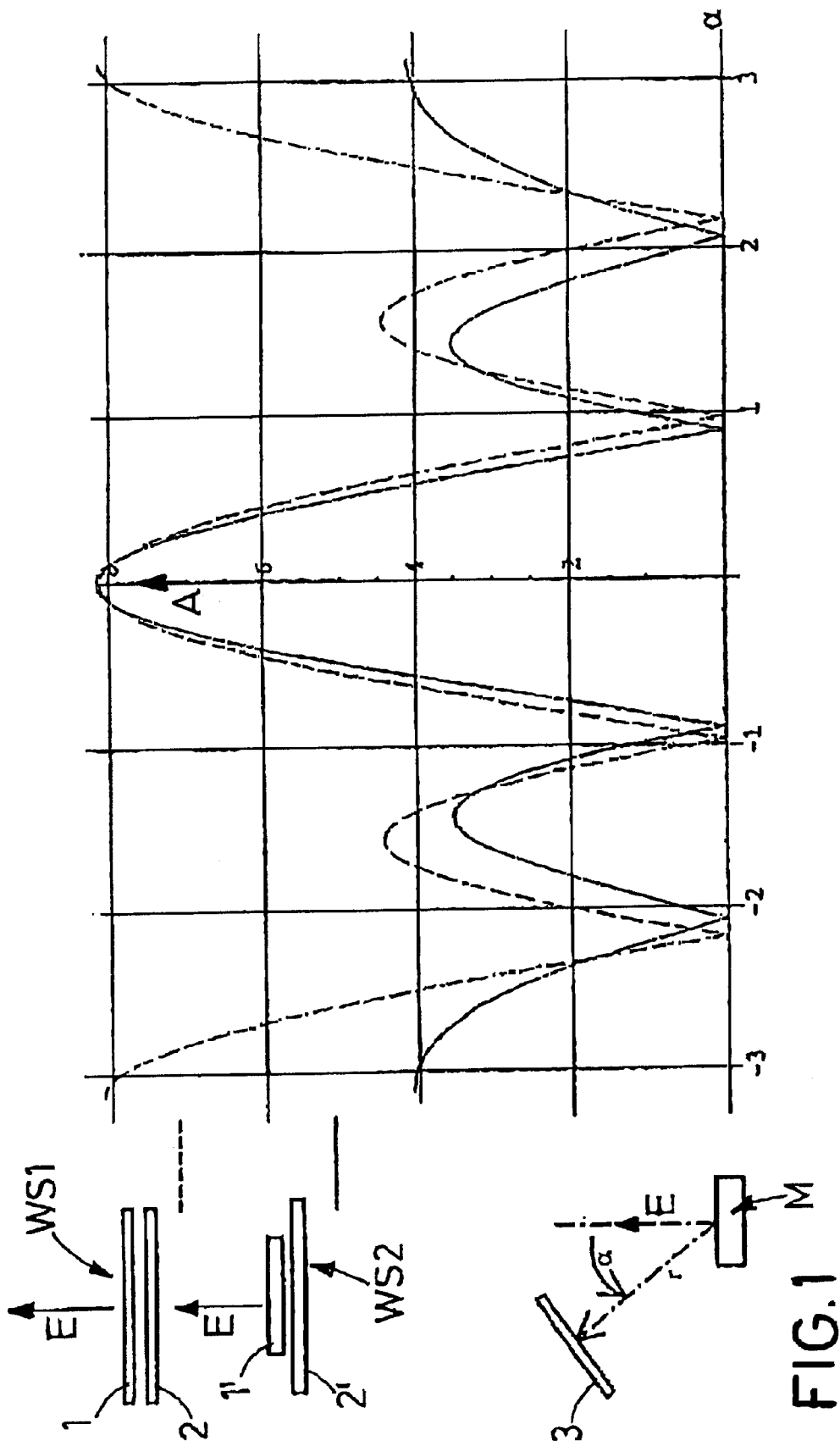
FIG. 1 is a diagram comparing the receiving properties of a prior art coil system and of a coil system according to the invention.

FIG. 1 compares two different coil arrangements with each other, namely a first coil system WS1 according to the prior art this application proceeds from and a second coil system WS2 of a first embodiment of the invention. The coil system WS1 comprises two coils 1, 2 of an identical diameter of for example 88 mm and a distance of 0.5 cm of the two coils in the direction of reception E.

In the case of the second coil system WS2, both coils 1', 2' have different diameters, the smaller coil 1' having a diameter of 60 mm and the other coil 2' having a diameter of 88 mm. The distance of the two coils in the direction or reception E is again 0.5 cm.

The graph according to FIG. 1, bottom left very diagrammatically illustrates a measuring arrangement, by means of which to test the two coil systems WS1 and WS2. The respective coil system WS1 or WS2 is positioned on the measuring desk M. An interference signal is beamed in at an angle $\alpha$ and a distance r of 30 cm from a source of interference 3 in the form of a coil of a diameter of 10 cm.

The measuring diagram seen in FIG. 1 outlines the dependence on the angle $\alpha$ of the amplitude A of the received voltage in the respective coil system WS1 and WS2. The angle a is laid off as radians on the ordinate of the diagram, whereas the amplitude A of the voltage of reception is not scaled on the abscissa. A dashed curve illustrates the angle-dependent behavior of reception of the prior art coil system WS1, whereas the solid line reflects the receiving signal of the coil system WS2 according to the invention. As apparent from a comparison of the two graphs, the coil system WS2 has a distinctly preferred direction in the case of an angle α=0. All sidebands of the receiving-signal curve are clearly lower than in the coil system WS1, having maxima at ±π/2 and ±π. The coil system WS1 exhibits identical sensitivity at α=0 and α=±π, i.e. the sensitivity is the same forwards as well as backwards.

The above comparison clarifies that certain directional characteristics can be attained by a corresponding selection of the diameters of the individual coils 1', 2' and the positions of the individual coils relative to each other, whereby the suppression of nonhomogeneous interference fields is improved.

Figure 2:
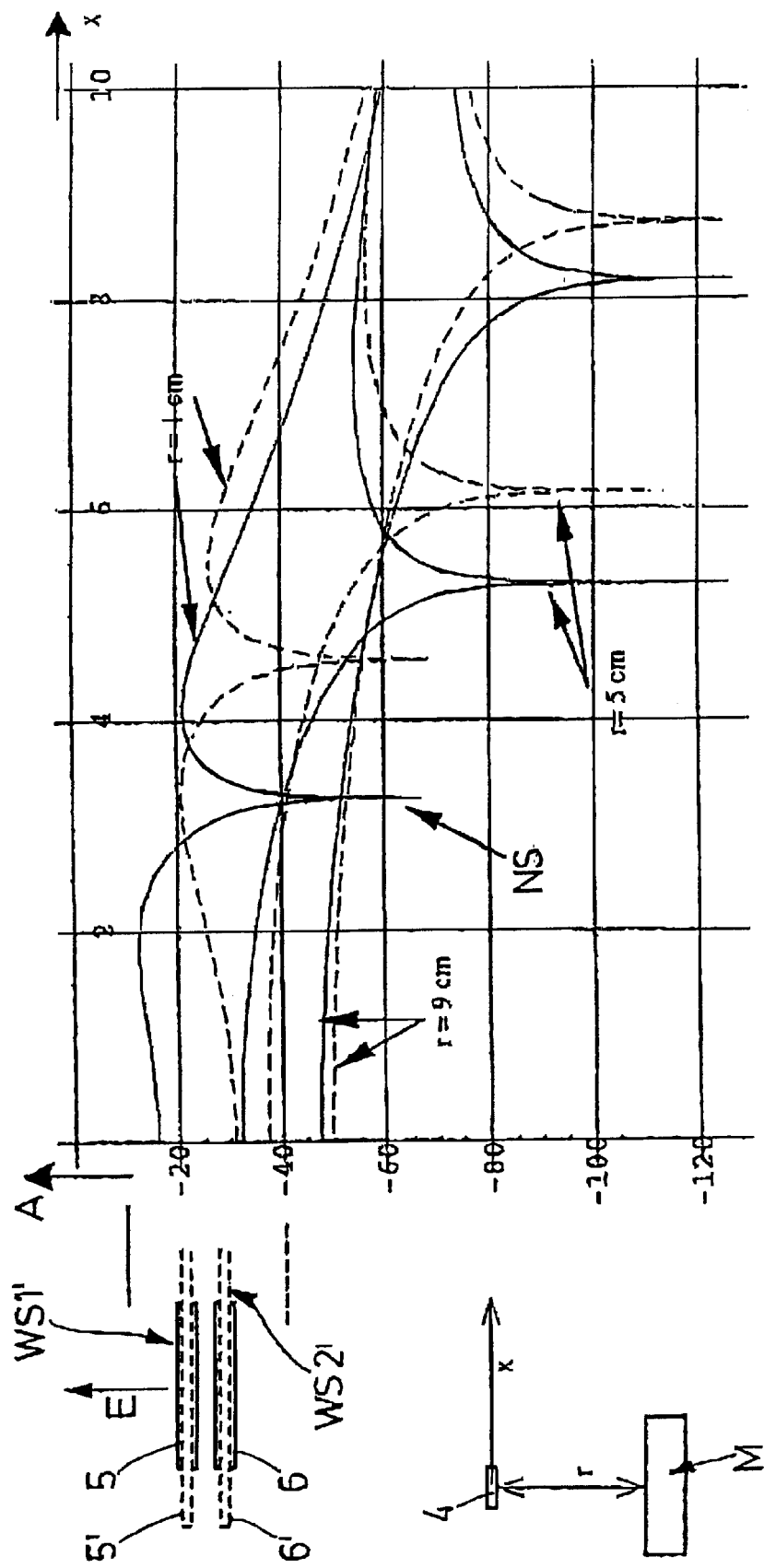
FIG. 2 is a diagram illustrating the receiving properties of another coil system in a second embodiment.

The graph of FIG. 2 helps explain another problem posed by the inductive transmittal of data by the aid of coil arrangements as already addressed in the introductory part of the description Details can be explained in conjunction with the measuring set-up seen in FIG. 2, bottom left. Again a measuring desk M is roughly outlined, on which to position a receiving coil system. Disposed at a distance r therefrom in the direction of reception E is a transmitter coil 4 of a diameter of 2 cm, which represents for instance the transmitter coil of a cardiac pacemaker. The received power—as received by the coil system on the measuring desk M—depends on the lateral displacement x of the transmitter coil 4 relative to the receiver-coil arrangement on the measuring desk M. Upon certain lateral deflections x the received power exhibits zeroes, as roughly outlined in the measuring g diagram of FIG. 2. The zeroes are recognizable by the cusps directed downwards in the individual graphs.

The pairs of curves in the measuring diagram according to FIG. 2 reflect a coil arrangement as roughly outlined in FIG. 2, top left This coil arrangement comprises two double coil systems of a coil system WS1' (illustrated by solid lines) and a coil system WS2' (illustrated by dashed lines). The coil system WS1' comprises two coils 5, 6 of a diameter of 60 mm and a distance from each other of 0.7 cm. Both coils 5, 6 are coaxial relative to each other.

The coil system WS2' comprises two coils 5', 6' which are coaxial with the corresponding coil 5, 6 of the first coil system WS1', having a diameter of in each case 88 mm. The coils 5', 6' are also in the same plane as the coils 5, 6, i.e. they also have a distance of 0.7 cm from each other.

If the receiver coil system with the two coil systems WS1', WS2' is placed an the measuring desk M for example at a distance of r=5 cm, a zero results at approximately 5.5 cm for the coil system WS1' and at 6.1 cm for the coil system WS2'. Other distances such as r=1 cm or r=9 cm will give zeroes at other positions of lateral displacement, for example x=3.5 cm and 4.8 cm or x=8.1 cm and 8.8 cm, respectively.

The measuring diagram clearly shows that, by using two double coil systems with the coils 5, 5', 6, 6', the receiving behavior can be optimized by selection of the appropriate coil system WS1' or WS2', given a certain position of the transmitter and receiver coil systems relative to each other. Failures in reception which are occasioned when a zero is hit are thus avoided The coils 5, 6 and 5', 6' may be hard-wired in the way of hardware implementation or combined selectively via switches, As a criterion for the suitability of the respective coil combination, use can be made of the receiver signal amplitude, the signal-to-noise ratio or other criteria which speak for the best sensitivity of reception at a respective instant. For clarification it has to be added that with the arrangement of two double coil systems seen in FIG. 2, also the improvement of the directional characteristic explained in conjunction with FIG. 1 can be obtained for instance by circuitry of the smaller coil 5 and the greater coil 6'.

Figure 3:
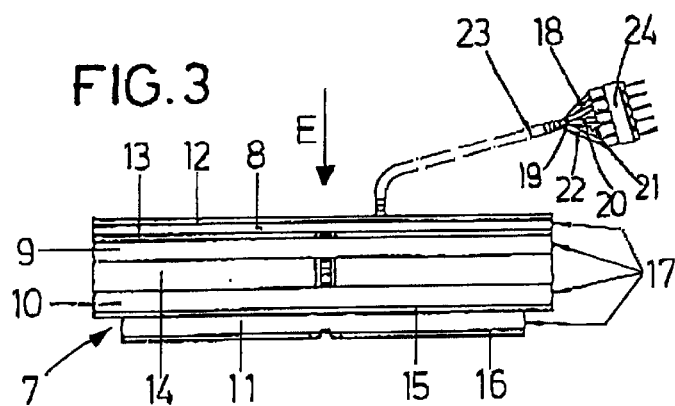
FIG. 3 is a side view of a complete coil arrangement in a further embodiment.
Figures 4, 5:
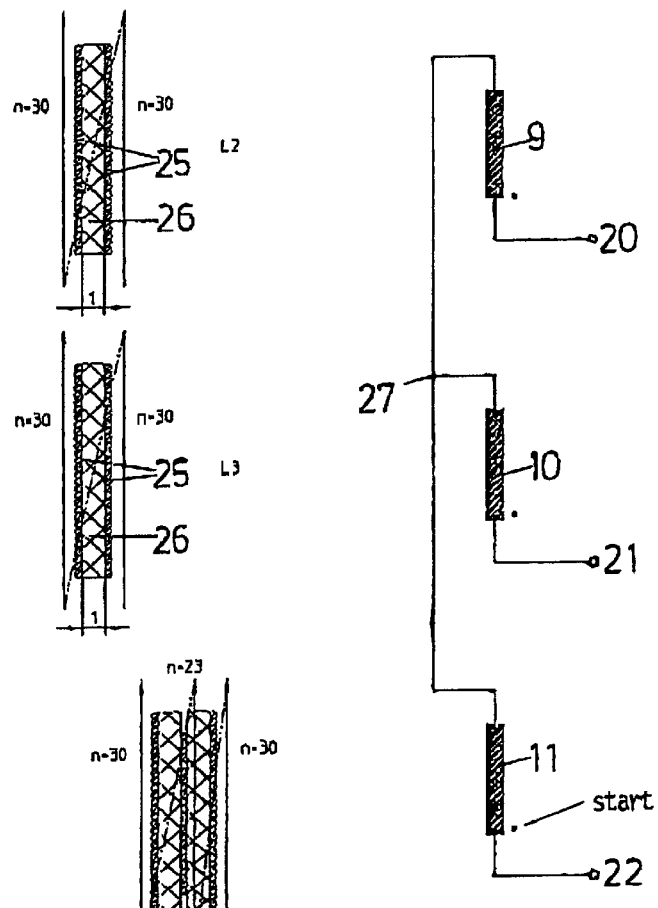
FIG. 4 is a block diagram illustrating the circuitry of the coil arrangement according to FIG. 3.
FIG. 5 is a diagrammatic view of the winding of the coil arrangement according to FIG. 3.

FIGS. 3 to 5 illustrate an example of putting the two coil systems and measuring principles into practice, which have been explained fundamentally in conjunction with FIGS. 1 and 2. They deal with a multi-section coil body 7 comprising four coils 1, 9, 10, 11 which are disposed coaxially and in the direction of reception E at a distance one after the other. These coils 8, 9, 10, 11 are wound on a respective coil body (not shown) with flanges 12, 13, 14, 15, 16. The outer layers of the individual coils 8 to 11 are covered by insulating tape 17.

The coil 8 is a transmitter coil. The coils 9, 10, 11 can be put in circuit variably to constitute a receiver coil system The connecting lines 18, 19, 20, 21, 22 seen in FIG. 5, of the coils 8, 9, 10, 11 are wired to form a strand 23 and discharge in a plug 24, by means of which the coil arrangement can be connected to a corresponding receiving circuit of a programing head of, for example, a cardiac pacemaker.

As seen in FIGS. 3 to 5, the two inner coils 9, 10 are equipped with an identical number of windings and diameter and separated from each other by a wider flange 14 as compared with the other flanges 12, 13, 15 and 16. The two coils 9, 10 have a number of sixty windings which are formed by two layers of in each case thirty windings 25 wound in the same direction. A spacer 26 is provided between the layers, keeping the two layers of the coils at a distance of 1 mm from each other.

The lowermost coil 11 has a smaller diameter and a number of eighty-three windings equi-directionally wound in three layers of thirty, twenty-three and again thirty successive windings. Again a spacer 26 is disposed between the layers of the coil, there-between keeping a distance of in each case 1 mm.

As seen in FIG. 4, the coils 9, 10, 11 are wound in the same direction and joined by their first ends in a neutral point 27. The second ends of the coils 9, 10, 11 are connected via the connecting lines 20, 21, 22. The transmitter coil 8 is separately connected via the connecting lines 18, 19. By corresponding circuitry of the connecting lines 20 to 22 via the plug 24, for example the coils 11 and 10 can be combined to form a coil system WS2 of coils of differing diameter and matched number of windings, or the coils 9 and 10 can be combined to form a coil system of an identical number of windings. Thus, the three coils 9, 10, 11 are connectable to form two different coil systems.

What is claimed is:

1. A telemetry coil arrangement for an inductive reception of transmitted signals comprising two or more coils spaced in a direction of reception, wherein at least two coils (1', 2', 5, 6, 5', 6', 8, 9, 10, 11) have varying diameters and numbers of windings suited to said varying diameters.

2. A coil arrangement according to claim 1, wherein at least three coils (5, 6, 5', 6') of at least two different diameters are provided.

3. A coil arrangement according to claim 2, wherein two pairs of coils (5, 6, 5', 6') form two coil systems (WS1', WS2') having a pair of smaller coils (5, 6) to be put in circuit in opposite directions and a pair of greater coils (5', 6') also to be put in circuit in opposite directions, both coil systems (WS1', WS2') being individually activable.

4. A coil arrangement according to claim 1, wherein said coils (5, 6, 5', 6', 9, 10, 11), in dependence on parameters of reception, are individually interconnectable to form combinations of coils.

5. A coil arrangement according to claim 4, wherein two coaxial coils (9, 10) spaced in the direction of reception and having an identical number of windings and diameter are provided as a basic pair of coils, to which at least two auxiliary coils (8, 11) of at least one of a varying number of windings and of a varying diameter are individually connectable.

6. A coil arrangement according to claim 1, wherein at least three coils are connectable to form at least two different coil systems.

7. A telemetry coil arrangement for an inductive reception of transmitted signals comprising two or more coils spaced in a direction of reception, wherein the coils having identical diameters are put into circuit asymmetrically.

8. A coil arrangement according to claim 7, wherein said coils (5, 6, 5', 6', 9, 10, 11), in dependence on parameters of reception, are individually interconnectable to form combinations of coils.

9. A coil arrangement according to claim 7, wherein two coaxial coils (9, 10) spaced in the direction of reception and having an identical number of windings and diameter are provided as a basic pair of coils, to which at least two auxiliary coils (8, 11) of at least one of a varying number of windings and of a varying diameter are individually connectable.

10. A coil arrangement according to claim 7, wherein at least three coils are connectable to form at least two different coil systems.

\* \* \* \* \*